(12) United States Patent
Cai et al.

(10) Patent No.: US 11,257,140 B2
(45) Date of Patent: Feb. 22, 2022

(54) ITEM RECOMMENDATION METHOD BASED ON USER INTENTION IN A CONVERSATION SESSION

(71) Applicant: National University of Defense Technology, Hunan (CN)

(72) Inventors: Fei Cai, Hunan (CN); Wanyu Chen, Hunan (CN); Zhiqiang Pan, Hunan (CN); Yitong Wang, Hunan (CN); Chengyu Song, Hunan (CN); Yanxiang Ling, Hunan (CN); Xin Zhang, Hunan (CN); Honghui Chen, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/325,094

(22) Filed: May 19, 2021

(65) Prior Publication Data

US 2021/0366025 A1  Nov. 25, 2021

(30) Foreign Application Priority Data

May 25, 2020  (CN) .......................... 202010450417.3

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
CPC ........... G06Q 30/0601–0645; G06Q 30/0631; G06N 20/00

USPC ...................................... 705/26.7, 26.1–27.2
See application file for complete search history.

(56) References Cited

U.S. PATENT DOCUMENTS

| | | | |
|---|---|---|---|
| 10,949,432 B1* | 3/2021 | Grayson | H04L 67/306 |
| 2017/0140268 A1* | 5/2017 | van Hasselt | G06N 3/04 |
| 2018/0068371 A1* | 3/2018 | Krishnamurthy | G06N 3/0427 |
| 2018/0218087 A1* | 8/2018 | Rapaka | H04L 67/306 |
| 2019/0205965 A1* | 7/2019 | Li | G06F 16/9535 |
| 2020/0349418 A1* | 11/2020 | Grabska-Barwinska | G06N 3/08 |
| 2020/0396512 A1* | 12/2020 | Nasir | H04N 21/4826 |

OTHER PUBLICATIONS

Xiaoting Zhao et al., Learning Item-Interaction Embeddings for User Recommendations, Feb. 19, 2019 (Year: 2019).*

* cited by examiner

*Primary Examiner* — Allison G Wood
*Assistant Examiner* — Anna Mae Mitros
(74) *Attorney, Agent, or Firm* — Dragon Sun Law Firm, PC; Jinggao Li, Esq.

(57) ABSTRACT

The present disclosure provides an item recommendation method and system based on a user intention in a conversation session. In this method, a current conversation session is encoded by use of items of prior time sequence and the last item so as to generate an accurate conversation session representation which is then used to perform initial item prediction as a user intention. Afterwards, an intention-guided neighbor detector is used to locate an accurate neighbor conversation session. Finally, the current conversation session and the neighbor conversation session representations are combined adaptively by a gated mixed layer to generate the final item recommendation, so as to effectively improve the accuracy of item recommendation.

5 Claims, 3 Drawing Sheets

ITEM RECOMMENDATION METHOD BASED ON USER INTENTION IN A CONVERSATION SESSION

CROSS-REFERENCE TO RELATED APPLICATION

This application claims priority from the Chinese patent application 202010450417.3 filed May 25, 2020, the content of which are incorporated herein in the entirety by reference.

TECHNICAL FIELD

The present disclosure relates to the field of content recommendation technologies, and in particular to an item recommendation method based on a user intention in a conversation session and a system thereof.

BACKGROUND

The current item recommendations based on conversation session contents mainly refer to item recommendations made based on anonymous user conversation sessions. In order to improve the accuracy of performing item recommendations based on anonymous conversation sessions, the researches already perform item recommendations using collaborative information from a neighbor conversation session of the current conversation session.

However, in the prior art, researches usually directly select some conversation sessions closer to the current conversation session as candidate neighbor conversation sessions. In this selection process, the neighbor conversation sessions are collected and identified according to only a cosine similarity without considering the user intention of the conversation sessions. Thus, the most relevant neighbor cannot be identified to obtain the effective neighbor representation, thereby affecting the accuracy of item recommendation. In addition, in the existing item recommendation model, no modeling is performed for time sequence signals and latest interests of the current conversation session at the same time, that is, item recommendation is not performed according to a long-term preference and a current interest of the user in the current conversation session, resulting in low recommendation accuracy. Further, the existing recommendation method cannot perform modeling for the time sequence signals and the latest interests in the current conversation session at the same time, which is not helpful to the accuracy of item recommendation.

SUMMARY

In view of this, the present disclosure provides an item recommendation method based on a user intention in a conversation session and a system thereof, so as to solve the existing problem of low accuracy of performing item recommendations based on the collaborative information of neighbor conversation session.

Provided is an item recommendation method based on a user intention in a conversation session, configured to predict an item that a user is likely to interact at a next moment from an item set as a target item to be recommended to the user, and comprising:

obtaining a current conversation session representation by encoding a current conversation session based on a trained recommendation model;

obtaining a user intention in the current conversation session according to the current conversation session representation;

obtaining a corresponding neighbor conversation session representation by identifying a neighbor conversation session of the current conversation session from a plurality of conversation sessions occurring before the current conversation session according to the user intention;

obtaining and recommending the target item to the user according to the current conversation session representation and the neighbor conversation session representation.

Preferably, obtaining the current conversation session representation by encoding the current conversation session based on the trained recommendation model includes:

obtaining an item embedding vector by embedding each item in the current conversation session to one d-dimension vector, and taking an item embedding vector corresponding to the last item in the current conversation session as a current interest of the user in the current conversation session;

obtaining a hidden state vector of the item according to the item embedding vector, and taking a hidden state vector corresponding to the item embedding vector corresponding to the last item in the current conversation session as a long-term preference of the user in the current conversation session;

obtaining the current conversation session representation by connecting the current interest and the long-term preference.

Preferably, the hidden state vector is obtained by allowing a gate recurrent unit (GRU) to act on the item embedding vector.

Preferably, obtaining the user intention in the current conversation session according to the current conversation session representation includes:

generating a prediction score of each item in the item set as the target item according to the current conversation session representation;

sorting items in the item set in a descending order according to the corresponding prediction scores, and selecting a vector formed by a plurality of items ranked top in the item set as the user intention in the current conversation session.

Preferably, obtaining the corresponding neighbor conversation session representation by identifying the neighbor conversation session of the current conversation session from a plurality of conversation sessions occurring before the current conversation session according to the user intention includes:

forming a conversation session memory by collecting conversation session representations of a plurality of conversation sessions occurring before the current conversation session and corresponding target item;

forming a to-be-identified neighbor conversation session representation by searching out each conversation session representation corresponding to the target item identical to one of items in the user intention in the conversation session memory according to the user intention;

sorting various conversation session representations in the to-be-identified neighbor conversation session representation according to the order of the items in the user intention;

forming a candidate neighbor conversation session of the current conversation session by selecting a plurality of conversation session representations ranked top in the sorted to-be-identified neighbor conversation session representation;

calculating a similarity between each conversation session in the candidate neighbor conversation session and the current conversation session, and selecting a plurality of conversation sessions ranked top in similarity in the candidate neighbor conversation session as each neighbor conversation session of the current conversation session;

calculating a weight sum of various neighbor conversation sessions as the neighbor conversation session representation.

Preferably, the conversation session memory is updated according to a first-in-first-out mechanism.

Preferably, obtaining and recommending the target item to the user according to the current conversation session representation and the neighbor conversation session representation includes:

obtaining a preference of the user by adaptively integrating the current conversation session representation and the neighbor conversation session representation using a gated mixed layer;

recommending the target item to the user by obtaining the target item according to the preference.

Preferably, before the current conversation session representation is obtained by encoding the current conversation session based on the trained recommendation model, the method further includes training the recommendation model using a back propagation algorithm.

Preferably, a parameter of the recommendation model is learned by using a cross entropy function as an optimization target.

Provided is an item recommendation system based on a user intention in a conversation session, configured to predict an item that a user is likely to interact at a next moment from an item set as a target item to be recommended to the user, and comprising a conversation session encoder, an intention generator, an intention-guided neighbor detector and a preference integrator.

The conversation session encoder is configured to obtain a current conversation session representation by encoding a current conversation session.

The intention generator is configured to generate a user intention in the current conversation session according to the current conversation session representation.

The intention-guided neighbor detector is configured to obtain a corresponding neighbor conversation session representation by identifying a neighbor conversation session of the current conversation session from a plurality of conversation sessions occurring before the current conversation session according to the user intention.

The preference integrator is configured to obtain a preference of the user by integrating the current conversation session representation and the neighbor conversation session representation, and predict a next item that the user is likely to interact from the item set as the target item to be recommended to the user according to the preference.

Therefore, in the item recommendation method based on a user intention in a conversation session and a system thereof in the present disclosure, the current conversation session is encoded by use of items of prior time sequence and the last item so as to generate an accurate conversation session representation which is then used to perform initial item prediction as the user intention. Afterwards, the intention-guided neighbor detector is used to locate an accurate neighbor conversation session. Finally, the current conversation session and the neighbor conversation session representations are combined adaptively by the gated mixed layer to generate the final item recommendation, so as to effectively improve the accuracy of item recommendation.

BRIEF DESCRIPTIONS OF THE DRAWINGS

DETAILED DESCRIPTIONS OF EMBODIMENTS

The technical solution of the examples of the present disclosure will be fully and clearly described below in combination with the accompanying drawings of the examples of the present disclosure. Apparently, these described examples are merely some of the examples of the present disclosure rather than all examples. Other examples made by those skilled in the art based on these examples without paying creative work all fall within the scope of protection of the present disclosure. It should be further noted that "the" in the detailed embodiments of the present disclosure only refers to technical belonging and features in the present disclosure. Further, it should be noted that the regular or italic fonts of the same numerals in the present disclosure refer to the same parameter, for example, the regular font $S_t$ and its italic $S_t$ both refer to the current conversation session.

Figure 1:
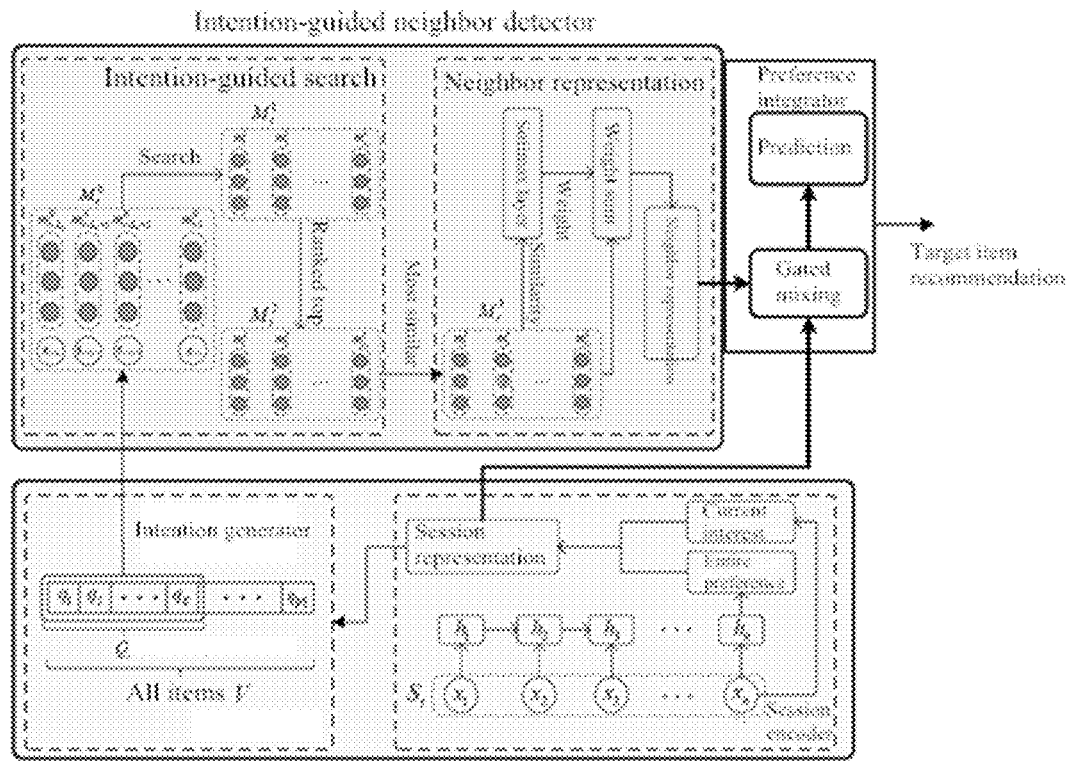
FIG. 1 is a block diagram of an item recommendation model based on a user intention in a conversation session according to the present disclosure.

The main purpose of an item recommendation based on conversation session contents is to predict a next item in which a user is likely to be interested from an item set $V_t=\{v_1, v_2, \ldots, v_{|V|}\}$ according to a current conversation session and recommend it as a target item to the user. For example, the item set is $V_t=\{v_1, v_2, \ldots, v_{|V|}\}$, a current conversation session is denoted as $S_t$, and the current conversation session $S_t$ is a conversation session $S_t=\{s_1, s_2, \ldots, s_n\}$ formed by n items at a time stamp t. In this case, the next item that the user is likely to interact is predicted as $s_{n+1}$ from the conversation session. In order to improve the accuracy of performing item recommendation based on conversation session contents, we considers a user intention in the current conversation session in building a recommendation model, so as to more accurately identify a neighbor conversation session of the current conversation session according the user intention and perform item recommendation according the current conversation session and the neighbor conversation session. Thus, we provide an item recommendation method based on a user intention in a conversation session, in which a next item that a user is likely to interact is predicted from an item set as a target item to be recommended to the user. The method is mainly performed by a recommendation model shown in FIG. 1 but not limited to implementation by the model shown in FIG. 1. FIG. 1 is an item recommendation model based on a user intention in a conversation session. A system run by the item recommendation model shown in FIG. 1 is an item recommendation system based on a user intention in a conversation session.

The item recommendation method based on a user intention in a conversation session according to the present disclosure mainly includes the following steps performed by a trained item recommendation model (the recommendation model shown in FIG. 1).

At step 1, a current conversation session representation is obtained by encoding a current conversation session.

We denote a current conversation session received by the recommendation model as $S_t$, and the current conversation session $S_t$ is a conversation session $S_t=\{s_1, s_2, \ldots, s_n\}$ formed by n items at a time stamp t, where $s_i (1 \leq i \leq n)$ refers to the i-th item at the time stamp t in the conversation session $S_t$. The conversation session $S_t$ is an expression of a vector, and thus $s_i$ is the i-th component of the conversation session vector. When the recommendation model receives the current conversation session $S_t$, the current conversation session $S_t$ is encoded in the following main manner: embedding each item $s_i$ in the conversation session $S_t$ to a d-dimension vector to convert it into an item embedding vector $x_i$, $x_i \in Rd$, $x_i$ is the i-th component of $X_t$, $X_t=\{x_1, x_2, \ldots, x_n\}$ which is an item embedding vector set formed by various item embedding vectors. Considering the last item $s_n$ reflects the latest interaction of the user, we directly select the last component $x_n$ (the item embedding vector corresponding to the last item in the current conversation session) after obtaining the item embedding vector set $X_t$ to represent a current interest $Z_t^{recent}$ of the user in the current conversation session. Thus, the current interest can be expressed in the following formula (1)

$$Z_t^{recent}=x_n \quad (1)$$

In order to capture a time sequence signal in the conversation session, we may obtain a hidden state $h_i$ of the item $s_i$ by use of a gated recurrent unit (GRU) in the item embedding vector set $X_t=\{x_1, x_2, \ldots, x_n\}$, where the main formula for obtaining the $h_i$ is as follows:

$$h_i=GRU(x_i, h_{i-1}) \quad (2)$$

Various hidden states $h_i$ form a hidden state vector set $H_t=\{h_1, h_2, \ldots, h_n\}$. We take the last component $h_n$ (a hidden state vector corresponding to the item embedding vector corresponding to the last item in the current conversation session) in the hidden state vector set $H_t$ as a long-term preference $Z_t^{globd}$ of the user. Therefore, the long-term preference may be expressed in the following formula (3):

$$Z_t^{globd}=h_n=GRU(x_n, h_{n-1}) \quad (3)$$

In order to completely use the current interest $Z_t^{recent}$ and the long-term preference $Z_t^{globd}$ of the user in the current conversation session, we finally obtain a representation $Z_t^{crrent}$ of the current conversation session by connecting the current interest $Z_t^{recent}$ and the long-term preference $Z_t^{globd}$. The conversation session representation may be expressed in the following formula (4):

$$Z_t^{crrent}=W_0[Z_t^{globd} \cdot Z_t^{recent}] \quad (4)$$

In the above formula (4), [·] refers to a connection operation, and $W_0 \in R^{d \times 2d}$ is used for linear projection.

At step 2, a user intention in the current conversation session is obtained according to the current conversation session representation.

Generating the user intention according to the current conversation session representation includes the following step 21.

At step 21, firstly, a prediction score of each item to be recommended to the user in the item set V as a next target item in which the user is likely to be interested is calculated according to the current conversation session representation in the following calculation formula (5):

$$\hat{y}_t^1=\text{soft max}(z_t^{currentT}X) \quad (5)$$

In the above formula, X is an embedding vector formed after all candidate items in the item set V are embedded into one d-dimension vector respectively to be converted into embedded items, $\hat{y}_t^1 \in R^{|V|}$ corresponds to a prediction score of each item $v_i \in V, Z_t^{crrentT}$ is a transpose matrix of $Z_t^{crrent}$. The higher prediction score means a higher probability that the corresponding item is recommended as the target item. Then, we sort all items in the item set in a descending order according to the prediction scores, and select a vector $Q_t$ formed by K items ranked top in the item set as a user intention of the current conversation session. The user intention $Q_t$ may be expressed in the following formula:

$$Q_t=\{q_1, q_2, \ldots, q_K\}$$

In the above formula, $q_i$ is the i-th item of the K items selected in the above sorting process.

At step 3, a corresponding neighbor conversation session representation is obtained by identifying a neighbor conversation session of the current conversation session from a plurality of conversation session occurring before the current conversation session according to the user intention.

In a given conversation session, item presentation will be repeated in the interaction process until the user needs are satisfied. Thus, the target item corresponding to the conversation session may implicitly represent the intention of the user. Therefore, after the after current conversation session $S_t$ is given, we may firstly collect the presentations of $L_0$ conversation sessions occurring before the current conversation session in sequence and their corresponding target item so as to form a conversation session memory $M_t^0$, i.e. $M_t^0=\{(m_{t-L_0}^0, g_{t-L_0}^0), \ldots, (m_{t-1}^0, g_{t-1}^0)\}$. $M_t^0$ and $g_i$ ($t-L_0 \leq i \leq t-1$) represent the representation of the conversation session $S_t$ and the corresponding target item. The conversation session memory $M_t^0$ is updated according to a first-in-first-out mechanism to ensure the latest $L_0$ conversation sessions before the current conversation session $S_t$ can be accommodated. Then, we attempt to construct a neighbor conversation session representation by selecting a sub-set from the $M_t^0$. This process includes two stages, i.e. an intention-guided search stage and a neighbor representation stage which are detailed below.

In the intention-guided search stage, we aim to search out a conversation session representation corresponding to the target item identical to one of items in the user intention in the given conversation session memory $M_t^0$, so as to form a to-be-identified neighbor conversation session representation $M_t^1$. That is, in the search process, if the target item in the conversation session memory appears in the user intention $Q_t$, the conversation session representation corresponding to the target item is selected as one to-be-identified neighbor conversation session representation $M_t^1$ which is expressed in the following formula (6):

$$M_t^1=\{m_1^0 | g_i=q_k, t-L_0 \leq i \leq t-1, 1 \leq k \leq K\} \quad (6)$$

Next, we re-sort the to-be-identified neighbor conversation session representations $M_t^1$ as $\{m_1^1, m_2^1, \ldots, m_{L_1}^1\}$ according to the order of items in the user intention $Q_t$ where $L_1$ represents a number of conversation sessions searched. Next, we select the representations of the first $L_2$ conversation sessions in the $M_t^1$ as a candidate neighbor conversation session representation $M_t^2$ of the current conversation session $S_t$, where $M_t^2 = \{m_1^2, m_2^2, \ldots, m_{L_2}^2\}$.

After the candidate neighbor $M_t^2$ is generated, we calculate a cosine similarity of each conversation session representation $m_j^2 \in M_t^2$ and the current conversation session representation $Z_t^{current}$ in the following formula (7) in order to determine a relevance degree of each candidate neighbor conversation session and the current conversation session $S_t$.

$$sim(z_t^{current}, m_j^2) = \frac{z_t^{current} m_j^2}{\|z_t^{current}\| \times \|m_j^2\|} \tag{7}$$

Next, various candidate neighbor conversation session representations are sorted based on the similarity and $L_3$ most similar conversation session representations are selected as the final neighbor representations $M_t^3$ of the current conversation session $S_t$, which is represented as $M_t^3 = \{m_1^3, m_2^3, \ldots, m_{L_3}^3\}$. Next, we calculate a weight sum of these neighbor conversation session representations in the following formula (8):

$$z_t^{neighbor} = \sum_{r=1}^{L_3} w_r m_r^3, 1 \leq r \leq L_3 \tag{8}$$

In the above formula, $m_r^3$, is a representation of the r-th neighbor conversation session of $M_t^3$, $Z_t^{neighbor}$ refers to a neighbor representation corresponding to $S_t$, the weight $w_r$ may be obtained in the following formula (9).

$$w_r = \text{soft max}(sim(Z_t^{recurrent}, m_r^3)) \tag{9}$$

$sim(\cdot)$ herein refers to a similarity calculated in the formula (7).

At step 4, the target item is obtained and recommended to the user according to the current conversation session representation and the neighbor conversation session representation.

After the current conversation session representation $Z_t^{current}$ is obtained by the formula (4) and the neighbor conversation session representation $Z_t^{neighbor}$ is obtained by the formula (8), we selectively (adaptively) integrate them by use of the gated mixed layer to represent a preference $u_t$ of the user with its expression formula (10) as follows:

$$u_t = f_t z_t^{current} + (1 - f_t) z_t^{neighbor} \tag{10}$$

$f_t$ in the formula (10) may be obtained by the formula (11):

$$f_t = \sigma(W_1 z_t^{current} + W_2 z_t^{neighbor}) \tag{11}$$

$\sigma$ in the formula (11) is a sigmoid activation function, and $W_1, W_2 \in R^{d \times d}$ is a trainable parameter. After obtaining the preference of the user by integrating the current conversation session representation and the neighbor conversation session representation, we obtain and recommend the target item to the user according to the preference of the user. Specifically, the manner in which the target item is recommended according to the preference is similar to the manner in which the user intention is obtained according to the current conversation session, that is, two steps are required:

firstly the prediction score of each item in the item set is calculated in the following formula (12) similar to the formula (5):

$$\hat{y}_t^2 = \text{soft max}(u_t^T X) \tag{12}$$

After the prediction scores are obtained, the item with the highest prediction score will be recommended to the user as the target item.

In order to train the recommendation model, we learn the parameter of the recommendation model by using the cross entropy function as an optimization target, with the specific formula (13) below:

$$L(\hat{y}_t^2) = -\sum_{i=1}^{|V|} y_i \log(\hat{y}_i) + (1 - y_i) \log(1 - \hat{y}_i) \tag{13}$$

$y_t$ and $\hat{y}_t$ herein are one-hot encoding of real purchase and the i-th component of $\hat{y}_t^2$. That is, if an item $v_t$ is a target item in a given conversation session, $y_t = 1$ otherwise, $y_t = 0$. Before steps 1 and 4 are performed using the recommendation model shown in FIG. 1, we also train the recommendation model by using a back propagation algorithm (BPTT).

In addition, the present disclosure provides an item recommendation system based on a user intention in a conversation session for performing the recommendation method provided in the present disclosure. As shown in FIG. 1, the item recommendation system includes a conversation session encoder, an intention generator, an intention-guided neighbor detector, and a preference integrator. The conversation session encoder is configured to obtain a current conversation session representation by encoding a current conversation session. The intention generator is configured to generate a user intention in the current conversation session according to the current conversation session representation. The intention-guided neighbor detector is configured to obtain a corresponding neighbor conversation session representation by identifying a neighbor conversation session of the current conversation session from a plurality of conversation sessions occurring before the current conversation session according to the user intention. The preference integrator is configured to obtain a preference of the user by integrating the current conversation session representation and the neighbor conversation session representation, and predict a next item that the user is likely to interact from an item set as the target item to be recommended to the user according to the preference. The preference integrator further includes a gated mixing module and a recommending module, where the gated mixing module is configured to integrate the current conversation session representation and the neighbor conversation session representation, and the recommending module is configured to recommend the target item to the user according to the integrated current conversation session representation and neighbor conversation session representation.

In order to verify the effectiveness and recommendation accuracy of the recommendation method and system based on a user intention in a conversation session in the present disclosure, we perform evaluation for the item recommendation method and system of the present disclosure on two reference datasets YOOCHOOSE and DIGINETICA, where the statistic data of the YOOCHOOSE and DIGINETICA datasets are shown in Table 1.

TABLE 1

| DATA | YOOCHOOSE | DIGINETICA |
|---|---|---|
| CLICK | 557,248 | 982,961 |
| TRAINING SESSOIN | 369,859 | 719,470 |
| TEST SESSION | 55,898 | 60,858 |
| ITEMS | 16,766 | 43,097 |
| AVERAGE SESSION LENGTH | 6.16 | 5.12 |

Figure 2:
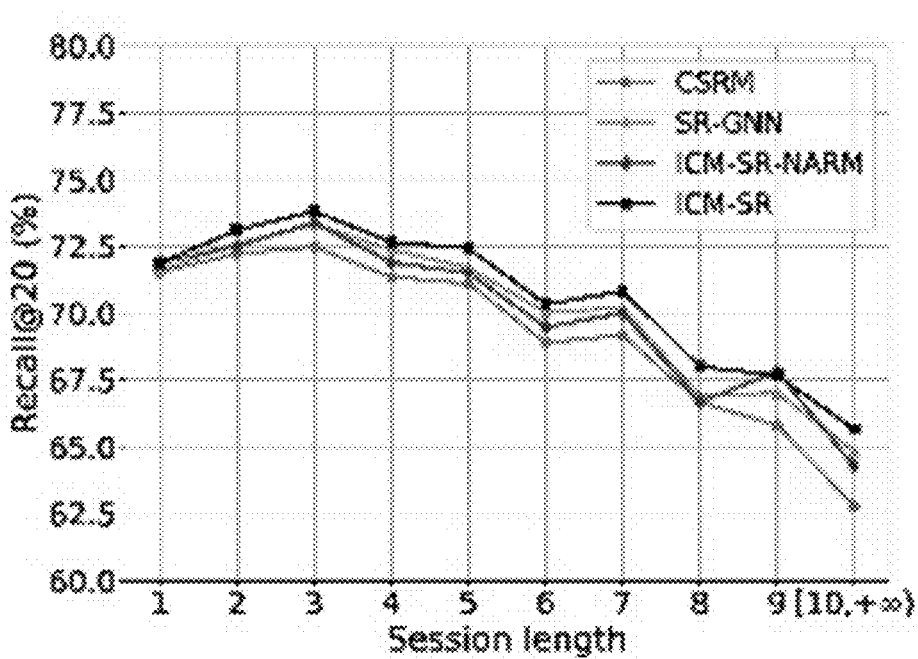
FIG. 2 is a schematic diagram of a comparison result of two reference models CSRM and SR-GNN and a recommendation model of the present disclosure based on a variation model of the present disclosure in terms of Recall@20 index on YOOCHOOSE dataset.
Figure 3:
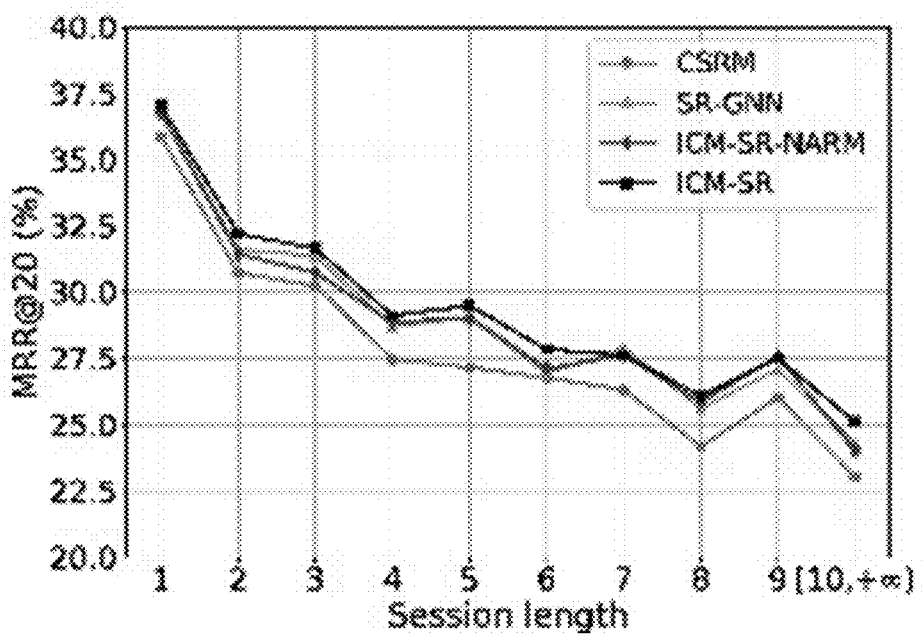
FIG. 3 is a schematic diagram of a comparison result of two reference models CSRM and SR-GNN and a recommendation model of the present disclosure based on a variation model of the present disclosure in terms of MRR@20 index on YOOCHOOSE dataset.
Figure 4:
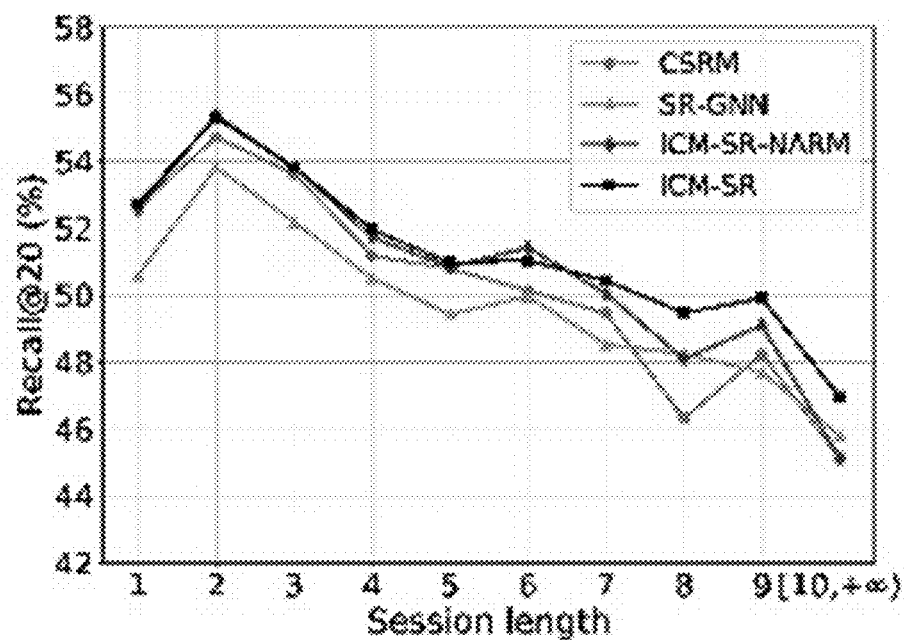
FIG. 4 is a schematic diagram of a comparison result of two reference models CSRM and SR-GNN and a recommendation model of the present disclosure based on a variation model of the present disclosure in terms of Recall@20 index on DIGINETICA dataset.
Figure 5:
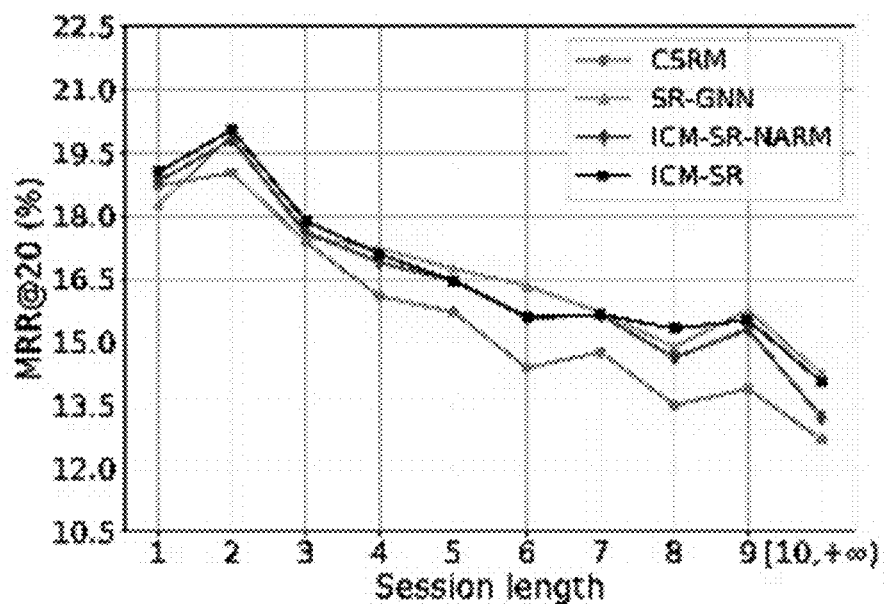
FIG. 5 is a schematic diagram of a comparison result of two reference models CSRM and SR-GNN and a recommendation model of the present disclosure based on a variation model of the present disclosure in terms of MRR@20 index on DIGINETICA dataset.

We compare the item recommendation model ICM-SR in the method of the present disclosure with nine existing competitive reference models, including: three traditional models S-POP, Item-KNN] and FPMC; four neural models based on a current conversation session, GRU4REC, NARM, STAMP and SR-GNN; and two neighbor enhancement methods RNN-KNN and CSRM. Further, we obtain a variation model based on the recommendation model of the method of the present disclosure, replace the conversation session encoder in FIG. 1 with NARM to form a variation model ICM-SR-NARM of the present disclosure and perform comparison together with the variation of the present disclosure. We perform test with 1/64 of the entire dataset of YOOCHOOSE. Specifically, we randomly select 10% of a training set as a verification set for parameter tuning. We adopt Adam as an optimizer with an initial learning rate set to 0.001, which attenuates by 0.1 for every three cycles. The batch size and L2 regularization are set to 100 and $10^{-5}$ respectively. The size $L_1$ of the conversation session memory is set to 10000 consistent with CSRM. In the present disclosure, K is set to 50, and the numbers of the candidate neighbors and the final neighbors are $L_2$ and $L_3$ which are set to 1000 and 100 respectively. We perform evaluation comparison for the recommendation effects of the models involved in the comparison by using Recall@N and MRR@N, with the comparison result shown in FIG. 2, where N is set to 20 in the test. The optimal reference model and the optimal models in each column are marked with underlines and bolds. The differences between ICM-SR and the optimal reference model and between ICM-SR and ICM-SR-NARM are detected and determined by using t.

TABLE 2

| | YOOCHOOSE | | DIGINETICA | |
|---|---|---|---|---|
| Method | Recall@ 20 | MRR@ 20 | Recall@ 20 | MRR@20 |
| S-POP | 30.44 | 18.35 | 21.06 | 13.68 |
| Item-KNN | 51.60 | 21.81 | 35.75 | 11.57 |
| FPMC | 45.62 | 15.01 | 31.55 | 8.92 |
| GRU4REC | 60.64 | 22.89 | 29.45 | 8.33 |
| NARM | 68.32 | 28.63 | 49.70 | 16.17 |
| STAMP | 68.74 | 29.67 | 45.64 | 14.32 |
| SR-GNN | 70.57 | 30.94 | 50.73 | 17.59 |
| RNN-KNN | 63.77 | 25.22 | 48.06 | 16.95 |
| CSRM | 69.85 | 29.71 | 51.69 | 16.92 |
| Variation model of the present disclosure | 70.52 | 30.67 | 52.04 | 17.48 |
| Recommendation model of the present disclosure | $71.11_\Delta$▲ | $31.23_\Delta$▲ | $52.32_\Delta$▲ | $17.74_\Delta$▲ |

As shown in Table 2, each reference model involved in the comparison achieves the best effect basically. Except for S-PoP, CSRM performs best in terms of Recall@20 index of DIGINETICA for the following reason: SR-GNN uses GGNN to model a transfer relationship, which helps to generate an accurate representation of the current conversation session. Thus, in the subsequent tests, we will adopt CSRM and SR-GNN as reference models.

In the subsequent test, we focus on the recommendation model and the variation model of the present disclosure. Generally, the recommendation model of the present disclosure achieves the best effect in terms of Recall@20 and MRR@20 indexes on the two datasets. In addition, we can see that the recommendation model of the present disclosure is superior to the variation model of the present disclosure, which indicates that the conversation session encoder proposed in our framework is capable of generating a more accurate conversation session representation than NARM. Compared with the variation model of the present disclosure, the recommendation model of the present disclosure has the increases of 0.84% and 0.54% in terms of Recall@20 on YOOCHOOSE and DIGINETICA respectively and has the increases of 1.86% and 1.48% in terms of MRR@20 respectively, which indicates that the conversation session encoder proposed by us is capable of ranking the target item higher in the recommendation list by modeling the time sequence signals and latest interests in the current conversation session. Compared with CSRM, the variation model of the present disclosure adopting a different neighbor selection strategy has a better performance for the following reason: the intention-guided neighbor detector is capable of selecting a more relevant neighbor conversation session to enhance the representation of the user preference. It is to be noted that compared with CSRM, the variation model of the present disclosure has an increase of 0.96% on YOOCHOOSE and an increase of 0.68% on DIGINETICA in terms of Recall@20, and has increases of 3.23% and 3.31% in terms of MRR@20. The larger increase in terms of MRR@20 indicates the intention-guided neighbor detector can also help the target item to return at a higher position.

We compared the performances of the recommendation model of the present disclosure, the variation model of the present disclosure and the best reference models CSRM and SR-GNN on different conversation session lengths. FIGS. 2-5 show the comparison results of two reference models CSRM and SR-GNN and the recommendation model of the present disclosure based on the variation model of the present disclosure in terms of Recall@20 and MRR@20 indexes on two datasets. We can see from FIGS. 2-5 that on the YOOCHOOSE dataset, the recommendation model of the present disclosure is generally higher than other models in terms of Recall@20 and MRR@20 on different conversation session lengths. Along with increase of the conversation session length, we find that all models perform stably in terms of Recall@20 before the length 5, and then show a continuous decrease trend. However, the general expression in terms of MRR@20 shows a decreasing trend. The decrease of the two indexes in a long conversation session may mean that the user may interact with more irrelevant items in a long conversation session occasionally or for curiosity. Interestingly, on the DIGINETICA dataset, all models achieve the best effect in terms of Recall@20 and MRR@20 on length 2, and show a general decreasing trend after that. Especially, the recommendation model of the present disclosure has a more obvious increase in terms of Recall@20 than in terms of MRR@20. In some cases of MRR@20, the recommendation model of the present disclosure performs inferior to SR-GNN. Furthermore, compared with the variation model of the present disclosure, the recommendation model of the present disclosure performs more obviously for a long conversation session in terms of Recall@20 and MRR@20, which indicates that the recommendation model of the present disclosure can more accurately represent the long conversation session by focusing on the latest interests in the current conversation session than the variation model of the present disclosure.

Therefore, in the item recommendation method based on a user intention in a conversation session and a system thereof in the present disclosure, the current conversation session is encoded by use of items of prior time sequence and the last item so as to generate an accurate conversation session representation which is then used to perform initial item prediction as the user intention. Afterwards, the intention-guided neighbor detector is used to locate an accurate neighbor conversation session. Finally, the current conversation session and the neighbor conversation session representations are combined adaptively by the gated mixed layer to generate the final item recommendation, so as to effectively improve the accuracy of item recommendation.

The examples of the present disclosure do not exhaust all possible details nor limit the present disclosure to the specific examples of the present disclosure. Many changes and modifications may be made according to the above descriptions. The specific examples of the present disclosure are used only to explain the principle and the actual application of the present disclosure better, so that those skilled in the art may use the present disclosure well or change the present disclosure for use. The present disclosure is only limited by the claims, and its entire scope of protection and equivalents.

What is claimed is:

1. An item recommendation method based on a user intention in a conversation session, configured to predict an item that a user is likely to interact at a next moment from an item set as a target item to be recommended to the user, comprising:

encoding a current conversation session $S_t$, yielding an encoded current conversation session, wherein the current conversation session $S_t$ is a session $S_t=\{s_1, s_2, \ldots, s_n\}$ formed by n items at a time stamp t, where $s_i$ (1≤i≤n) refers to an i-th item at a time stamp t in the session $S_t$, and wherein the current session $S_t$ is encoded in the following manner: embedding each item $s_i$ in the current conversation session $S_t$ to a d-dimension vector and converting the d-dimension vector into an item embedding vector $x_i$, $x_i \in Rd$, $x_i$ is an i-th component of $X_t$, $X_t=\{x_1,x_2, \ldots, x_n\}$ being an item embedding vector set formed by item embedding vectors;

obtaining a current conversation session representation by the encoded current conversation session based on a trained recommendation model, wherein obtaining the current conversation session representation by the encoded current conversation session based on the trained recommendation model comprises:

obtaining an item embedding vector by embedding each item in the current conversation session to one d-dimension vector, and taking an item embedding vector corresponding to a last item in the current conversation session as a current interest of the user in the current conversation session, wherein the current interest can be expressed in the following formula: $Z_t^{recent}=x_n$ (1);

obtaining a hidden state vector of the last item in the current conversation session according to the item embedding vector to capture a time sequence signal in the current conversation session, wherein the hidden state vector represents a long term preference of the user in the current conversation session, wherein the formula for obtaining a hidden state $h_t$ of the item $s_i$ is as follows: $h_i=GRU(x_i,hi_{-1})$ (2); and the long term preference of the user is expressed as: $Z_t^{globd}=h_n=GRU(x_n,h_{n-1})$ (3), where GRU is a gate-recurrent unit (GRU); and obtaining the current conversation session representation by connecting the current interest and the long-term preference, wherein the current conversation session representation is expressed as: $Z_t^{crrent}=W_0[Z_t^{globd}.Z_t^{recent}]$ (4);

obtaining a user intention in the current conversation session $S_t$ according to the current conversation session representation, wherein a prediction score of each item to be recommended to the user in an item set V as a next target item in which the user is likely to be interested is calculated according to the current session representation in the following calculation formula (5): $\hat{y}_t^1=softmax(z_t^{currentT}X)$ (5), wherein X is an embedding vector formed after all candidate items in the item set V are embedded into one d-dimension vector respectively to be converted into embedded items, $\hat{y}_t^1 \in R^{|V|}$ corresponds to a prediction score of each item $v_i \in V$, $z_t^{currentT}$ is a transpose matrix of $Z_t^{crrent}$;

obtaining a corresponding neighbor conversation session representation by identifying a neighbor conversation session of the current conversation session from a plurality of conversation sessions occurring before the current conversation session according to the user intention:

obtaining and recommending the target item to the user according to the current conversation session representation and the neighbor conversation session representation, wherein obtaining and recommending the target item to the user according to the current conversation session representation and the neighbor conversation session representation comprises:

obtaining a preference $u_t$ of the user by adaptively integrating the current conversation session representation and the neighbor conversation session representation, wherein the preference $u_t$ is expressed as: $u_t=f_t z_t^{current}+(1-f_t)z_t^{neighbor}$, $f_t=\sigma(W_1 z_t^{current}+W_2 z_t^{neighbor})$, wherein σ in the formula is a sigmoid activation function, and $W_1,W_2 \in R^{d \times d}$ is a trainable parameter, $z_t^{current}$ is the current conversation session representation and $z_t^{neighbor}$ is the neighbor conversation session representation; and recommending an optimization target to the user by obtaining the target item according to the preference $u_t$, thus achieving the item recommendation method by modeling time sequence signals and latest interests of the current conversation session at a same time, thereby improving an accuracy of the item recommendation, wherein the step of the recommending the optimization target is to learn the trainable parameter of the trained recommendation model by using a cross entropy function as the optimization target.

2. The item recommendation method according to claim 1, wherein the hidden state vector is obtained by allowing the gate recurrent unit (GRU) to act on the item embedding vector.

3. The item recommendation method according to claim 1, wherein obtaining the user intention in the current conversation session according to the current conversation session representation comprises:

generating a prediction score of each item in the item set as the target item according to the current conversation session representation;

sorting items in the item set in a descending order according to the corresponding prediction scores, and selecting a vector formed by a plurality of items ranked top in the item set as the user intention in the current conversation session.

4. The item recommendation method according to claim 1, wherein obtaining the corresponding neighbor conversation session representation by identifying the neighbor conversation session of the current conversation session from a plurality of conversation sessions occurring before the current conversation session according to the user intention comprises:

forming a conversation session memory by collecting conversation session representations of a plurality of conversation sessions occurring before the current conversation session and corresponding target item;

forming a to-be-identified neighbor conversation session representation by searching out each conversation session representation corresponding to the target item identical to one of a plurality of items in the user intention in the conversation session memory according to the user intention;

sorting various conversation session representations in the to-be-identified neighbor conversation session representation according to an order of the plurality of items in the user intention;

forming a candidate neighbor conversation session of the current conversation session by selecting a plurality of conversation session representations ranked top in the sorted to-be-identified neighbor conversation session representation;

calculating a similarity between each conversation session in the candidate neighbor conversation session and the current conversation session, and selecting a plurality of conversation sessions ranked top in similarity in the candidate neighbor conversation session as each neighbor conversation session of the current conversation session;

calculating a weight sum of various neighbor conversation sessions as the neighbor conversation session representation.

5. The item recommendation method according to claim 4, wherein the conversation session memory is updated according to a first-in-first-out mechanism.

* * * * *